United States Patent

Gaskins

[15] 3,680,523

[45] Aug. 1, 1972

[54] PRESSURE INDICATOR

[72] Inventor: Thomas Gaskins, Palmdale, Fla. 32401

[22] Filed: Oct. 28, 1970

[21] Appl. No.: 84,606

[52] U.S. Cl.................116/34 R, 73/146.8, 340/58
[51] Int. Cl.............................................B60c 23/06
[58] Field of Search............73/146.8, 146.3; 340/58; 116/34 R

[56] References Cited

UNITED STATES PATENTS 1,281,274  10/1918  Berry..........................116/34 R

FOREIGN PATENTS OR APPLICATIONS 776,268  10/1934  France...........................340/58

*Primary Examiner*—Donald O. Woodiel
*Attorney*—Mason, Fenwick & Lawrence

[57] ABSTRACT

A pressure indicator suitable for use with a device containing a fluid under pressure generally consisting of a movable means including a chamber communicable with the fluid under pressure, operable responsive to a predetermined pressure within the chamber for urging the movable means into a predetermined orientation, and biasing means cooperable with the movable means for urging the movable means out of the predetermined orientation when the pressure in the chamber is below the predetermined pressure.

3 Claims, 8 Drawing Figures

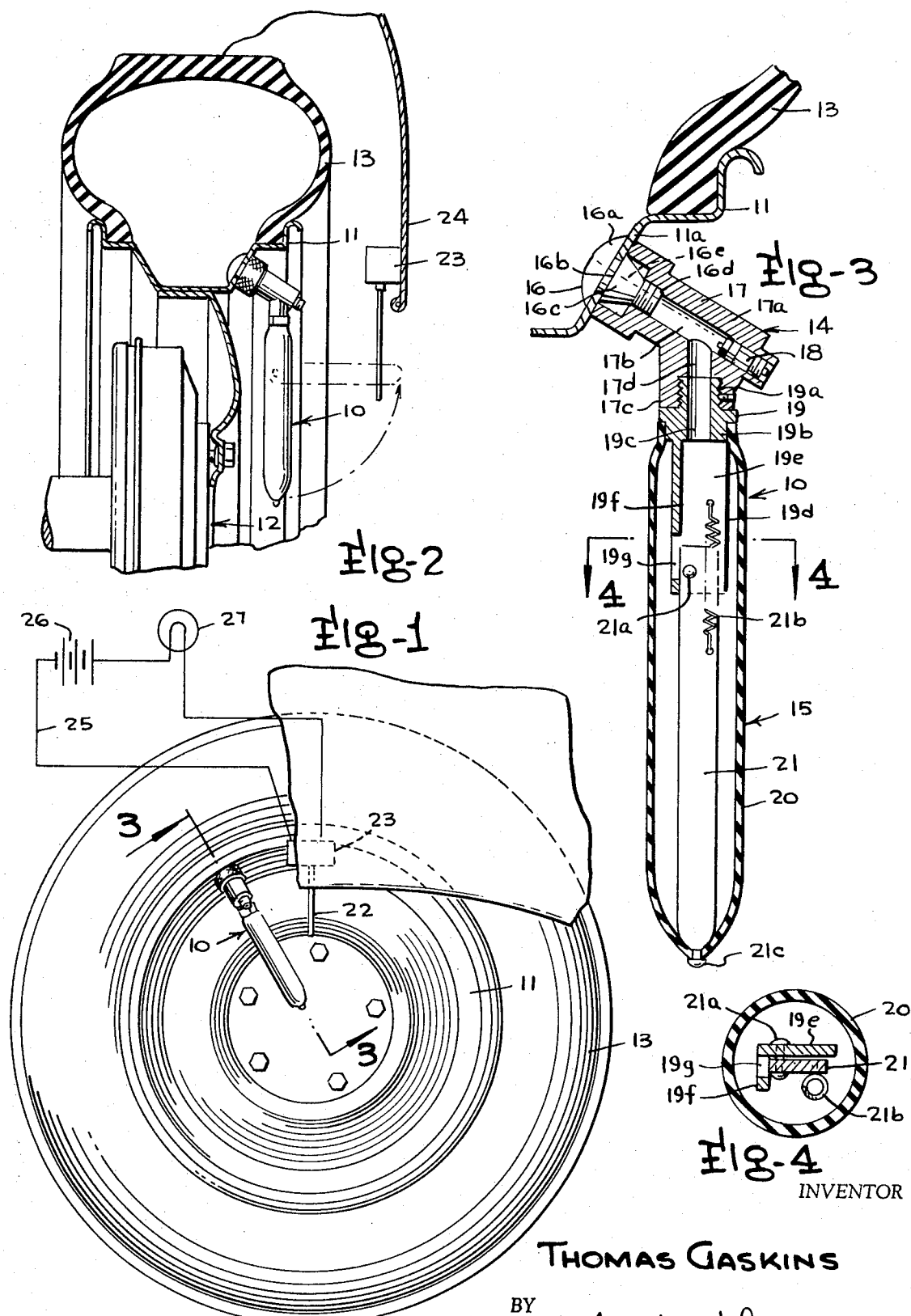

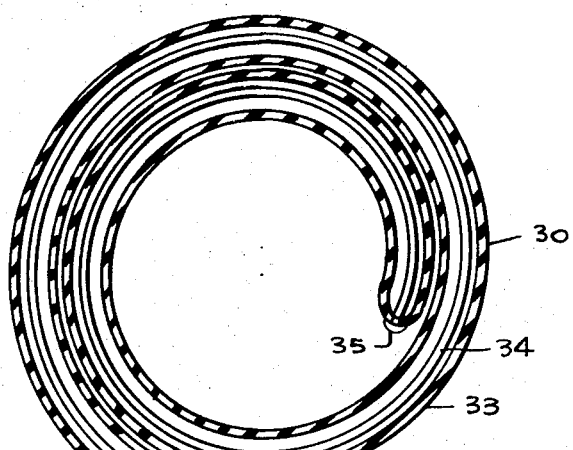
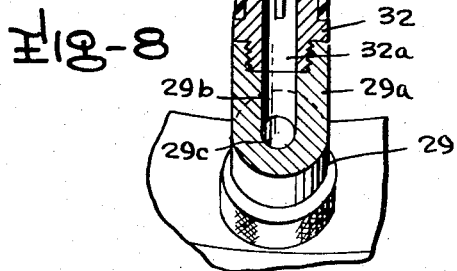
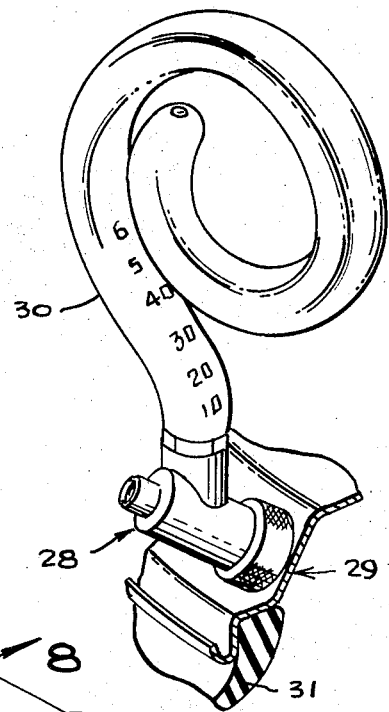
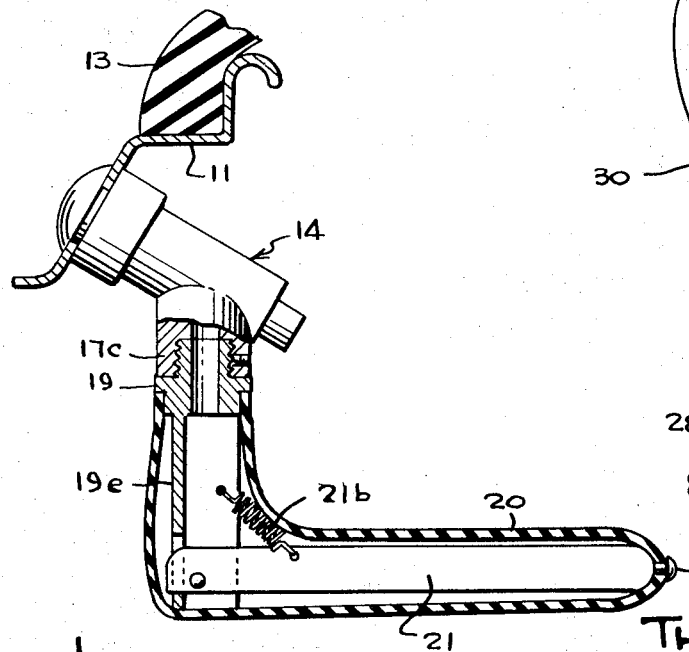
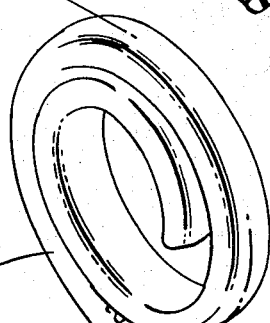
INVENTOR
THOMAS GASKINS
BY Mason, Fenwick & Lawrence
ATTORNEYS

PRESSURE INDICATOR

This invention relates to a pressure indicator and more particular to a device for indicating when the pressure within a chamber has fallen below a predetermined value.

In the operation of conventional vehicles having pneumatic tires, an undue loss of pressure in the tires can result in undesirable tire wear, improper operation of the vehicle and unsafe driving conditions. Most often, it has been customary periodically to check tire pressures only when a vehicle is being refueled or serviced, during which times the checking of tire pressures either is overlooked or purposed deferred. It thus has been found to be desirable to provide a device for automatically indicating when the pressure of a pneumatic tire has fallen below a predetermined amount.

Accordingly, it is the principal object of the present invention to provide a novel pressure indicator.

Another object of the present invention is to provide a novel device for indicating when the pressure within a chamber has fallen below a predetermined amount.

A further object of the present invention is to provide a novel device for indicating the pressure in a pneumatic tire.

A still further object of the present invention is to provide a novel pressure indicator for a pneumatic tire which automatically will alert the driver of a vehicle on which such indicators are installed that the pressure in the tires has fallen below a predetermined amount.

Another object of the present invention is to provide a novel pressure indicator which is simple in construction, inexpensive to manufacture and simple in operation.

Other objects and advantages of the present invention will become more apparent to those persons having ordinary skill in the art to which the invention pertains, from the following description taken in conjunction with the accompanying drawings wherein:

FIG. 1 is a front elevational view of an embodiment of the invention mounted on a vehicle tire;

FIG. 2 is a side elevational view of the embodiment illustrated in FIG. 1;

FIG. 3 is an enlarged cross sectional view taken along line 3,3 in FIG. 1;

FIG. 4 is an enlarged cross sectional view taken along line 4,4 in FIG. 3;

FIG. 5 is a cross sectional view similar to the view shown in FIG. 3, illustrating the embodiment in a different sequence of operation;

FIG. 6 is a perspective view of another embodiment of the invention;

FIG. 7 is a perspective view similar to the view as shown in FIG. 6, illustrating the embodiment in a different sequence of operation; and FIG. 8 is an enlarged cross sectional view taken along line 8,8 in FIG. 6.

Briefly described, the present invention relates to a pressure indicator suitable for use with a device containing a fluid under pressure, such as a pneumatic tire for a vehicle, generally consisting of a movable means including a chamber communicable with the fluid under pressure, operable responsive to a predetermined pressure within the chamber for urging the movable means into a predetermined orientation, and biasing means cooperable with the movable means for urging the movable means out of the predetermined orientation when the pressure in the chamber is below the predetermined pressure. In one embodiment of the invention, the movable means comprises a flexible, inflatable enclosure means defining the chamber, and the biasing means comprises a rigid arm member pivotally connected to a support member of the indicator and secured at a point spaced from the pivotal connection of the arm member, to the enclosure means, and a spring interconnecting the support member and the arm member. In another embodiment of the invention, the movable means comprises a flexible, inflatable enclosure means defining the chamber, and the biasing means comprises a spring member rigidly secured to a support member of the indicator and secured to the enclosure means at a point spaced from the support member.

Referring to FIGS. 1 through 5 of the drawings, there is illustrated a first embodiment of the invention. The invention consists of a pressure indicator 10 mountable on the rim 11 of a wheel assembly 12, and which communicates with the interior of an inflatable tire 13 mounted on the rim 11 in the conventional manner. As best illustrated in FIG. 3, the pressure indicator includes a valve unit 14 mounted on the tire rim 11 and indicator unit 15. The valve unit 14 consists of a mounting member 16, a valve stem 17 and a conventional valve 18. The mounting unit 16 essentially consists of a grommet having an enlarged end section 16a engaging the inner side of tire rim section 11a, a reduced shank portion 16b extending through an opening 11b in the rim wall section 11a, an enlarged section 16c engaging the outer side of the rim wall section 11a, and a threaded end portion 16d. The mounting member 16 preferably consists of a resilient material such as rubber which would readily permit the insertion of the section 16c through the opening 11b, and the threaded section 16d is formed of a rigid material which may consist of any suitable metallic or plastic material.

The valve stem 17 includes a cylindrical section 17a providing an axial passageway 17b and an integral offset section 17c having a passageway 17d communicating with the passageway 17b. One end of the passageway 17b is threaded so that the section 17a may be threaded onto the threaded end section 16b of the mounting member with an enlarged end portion of the section 17a enclosing the mounting section 16c and engaging the rim wall section 11a, as illustrated in FIG. 3. With the valve stem 17 threaded on the mounting member 16, the passageway 17b communicates with the interior of the tire 13 by means of an axial passageway 16e provided in the mounting member 16.

The valve 18 is disposed in the passageway 17b of the valve stem between the outer end of the valve stem and the passageway 17d in the offset section 17c so that the passageway 17d will always communicate with the interior of the tire 13 through passageways 17b and 16e. The valve 18 is of the conventional type which will prevent leakage of air within the tire 13 through the valve unit, and which is operable in the conventional matter to supply air under pressure to the tire 13 through the valve unit. The indicator unit 15 consists of a mounting member 19, and elongated flexible enclosure member 20 and an arm member 21 interconnecting the mounting member 19 and a free end of the enclosure member 20. The mounting member 19 is provided with a reduced, threaded end section 19a threaded into a threaded opening in the end of the offset section 17c, and a reduced opposite end section 19d onto which the inner end of the enclosure member 20 is secured. The mounting member 19 is provided with a passageway 19c which is aligned with the passageway 17d of offset section 17c when the threaded section 19a is disposed in the threaded opening of the offset section as shown in FIG. 3.

The mounting member 19 is provided with a projecting section 19d having a pair of wall portions 19e and 19f which are disposed at right angles, as best illustrated in FIG. 4. The inner end of the arm member 21 is pivotally connected to the outer end of wall portion 19e by means of a pivot pin 21a and is biased in a position substantially perpendicular to the projecting section 19d by means of a spring 21b interconnecting the projecting section 19b and the arm member 21, as best illustrated in FIG. 5. To accommodate the inner end of arm member 21 when it is disposed in the position as illustrated in FIG. 5, the outer end of the wall portion 19f is provided with an opening 19g. As illustrated in FIGS. 3 and 5, the free end of the arm member 21 is secured to the free end of the enclosure member 20 by means of a rivet 21c.

When the arm member 21 is urged by the spring 21b into the position that is illustrated in FIG. 5, the indicator member 15 will engage an actuating arm 22 of an electrical switch 23 mounted on the inner side of an adjacent fender of the vehicle, as best shown in FIGS. 1 and 2. The electrical switch 23 is provided with an electrical supply circuit 25 including an electrical supply source such as a battery 26, and an alarm device such as a light 27 so that when the indicator member 15 trips the actuating arm 22 to close the switch 23, the alarm device 27 will be energized by the electrical circuit.

The components of the pressure indicator as described are designed so that when air under pressure is supplied to the tire 13 through the valve unit 14, and the tire 13 is under a predetermined pressure, the enclosure member 20 will inflate and assume the orientation as illustrated in FIG. 3 with the arm member 21 disposed in substantial alignment with the projecting section 19d. Under such circumstances, by viewing the position of the indicator 15, the operator of the vehicle will be able to know that there is sufficient pressure within the tire 13. The components of the pressure indicator further are designed, however, so that when the pressure within the tire 13 falls below a predetermined amount, the biasing action of the loaded spring 21b will cause the arm member 21 to pivot about the pin 21a toward the position as illustrated in FIG. 5. When the arm member assumes the position as illustrated in FIG. 5, this will be an indication that the pressure within the tire 13 has fallen to a critical level. Upon assuming the position as illustrated in FIG. 5, the indicator unit 15 will trip the switch 23 thus energizing the alarm device 27 to warm the vehicle operator that the pressure level in the tires is critically low.

The construction of the pressure indicator as described, readily permits the inflation of the tire 13 with a conventional air supply line available at most commercial service stations, which may be connected to the free end of the valve unit 14 so that the valve 18 will be opened to admit air from the pressure line into the tire 13 to the valve unit. It further is to be noted that by a proper selection of materials and design of components, the pressure indicator will be calibrated so that the spring 21b will function to pivot the arm member 21 when the pressure in the interior of the tire 13 which communicates with the interior of the enclosure member 20 through passageways 16e, 17b, 17d, and 17c, falls below a predetermined level. When the vehicle operator is alerted to the low pressure in the tire 13, he will know to drive to the nearest service station and increase the pressure in the tires. Upon doing so, the increased air pressure within the tire will again inflate the enclosure member 20, causing the arm member 21 to pivot into the position as illustrated in FIG. 3, and to reload the spring 21b.

FIGS. 6 through 8 illustrate another embodiment of the invention which is similar in many respects to the embodiment illustrated in FIGS. 1 through 5. The embodiment includes a valve unit 28 mounted on a wheel rim 29, and an indicator unit 30 which is mounted on the valve unit 28. As best illustrated in FIG. 8, the valve unit 28 includes a valve stem member 29 having an offset mounting section 29a. The offset section 29a is provided with an internal passageway 29b which communicates with the interior of a tire 31 through a passageway 29c of the valve stem member.

The indicator unit 30 consists of a mounting member 32 threaded into the outer end of the offset section 29a, an elongated flexible, enclosure member 33 secured at one end to the mounting member 32 so that the interior thereof communicates through a passageway 32a in the mounting member 32, and passageways 29b and 29c, with the interior of the tire 31, and a spirally or helically shaped spring member 34 having the inner end thereof rigidly secured to the mounting member 32 and the outer end thereof secured to the end of the enclosure member 33 as at 35.

The embodiment as illustrated in FIGS. 6 through 8, functions similarly to the embodiment illustrated in FIGS. 1 through 5 to indicate the amount of pressure within the tire 31. When air under pressure is supplied through the valve unit 28 to the tire 31, the enclosure member 33 of the indicator unit will be caused to inflate and assume a position or orientation as illustrated in FIG. 7. As the enclosure member inflates, the spring member 34 is caused to expand and assume curvatures of increased radii. As the air in the tire 31 begins to leak or is otherwise lost, and pressure within the tire 31 correspondingly decreases, the indicator will be urged to the position or orientation as illustrated in FIG. 6, under the biasing influence of the spring member 34. As soon as the indicator unit assumes the position as illustrated in FIG. 6, the vehicle operator would be alerted to the low level of pressure within the tire.

It is contemplated that the indicator unit would be calibrated and appropriate markings placed on the enclosure member so as to indicate the pressure within the tire 31. It further is contemplated that the tire pressures be indicated in increments from a point adjacent the mounting member 32 and extending outwardly along the length thereof, and an end portion of the enclosure member be provided with a pointer or other indicator cooperating with the indicia on the inner end of the enclosure member to designate the particular air pressure of the tire 31.

Upon noticing the contracted configuration of the indicator unit 30 as illustrated in FIG. 8, the vehicle operator would be alerted of the low pressure in the tire, and thus caused to drive immediately to the nearest service station to refill his tires. Upon doing so, the increased pressure in the tire 31 will cause the enclosure member 30 to become inflated and subsequently assume the configuration as illustrated in FIG. 7 thus indicating that the proper air pressure in the tire has been attained.

From the foregoing detailed description, it will be evident that there are a number of changes, adaptations, and modifications of the present invention which come within the province of those skilled in the art. However, it is intended that all such variations not departing from the spirit of the invention be considered as within the scope thereof as limited solely by the appended claims.

I claim:

1. In an inflatable tire having a valve including a valve stem provided with a fluid passageway communicating with the interior of said tire, a valve seat provided in said passageway and a valve element engageable with said valve seat, a device for indicating the pressure in said tire comprising movable means including a chamber communicable with said passageway, operable responsive to a predetermined pressure within said tire for urging said movable means into a predetermined orientation, said movable means comprising a flexible, inflatable enclosure means defining said chamber, secured to a base portion of said valve stem, having a passageway intercommunicating said chamber and said first mentioned passageway of said valve stem, biasing means cooperable with said movable means for urging said movable means out of said predetermined orientation when the pressure in said tire falls below a predetermined amount, said biasing means comprising a rigid arm member pivotally connected to said base portion and secured to said enclosure means at a point spaced from the pivotal connection thereof, and a spring interconnecting said base portion and said arm member.

2. In an inflatable tire having a valve including a valve stem provided with a fluid passageway communicating with the interior of said tire, a valve seat provided in said passageway and a valve element engageable with said valve seat, a device for indicating the pressure in said tire according to claim 1 wherein said base portion includes stops engageable by said arm member for limiting the travel of said arm member between predetermined limits.

3. In an inflatable tire having a valve including a valve stem provided with a fluid passageway communicating with the interior of said tire, a valve seat provided in said passageway and a valve element engageable with said valve seat, a device for indicating the pressure of said tire according to claim 1 including an alarm system having means operable responsive to a predetermined position of said arm member for actuating said alarm system.

* * * * *